United States Patent [19]

Shimada

[11] Patent Number: 5,687,238

[45] Date of Patent: Nov. 11, 1997

[54] SMALL SIZE PRODUCT CIPHER APPARATUS

[75] Inventor: Michio Shimada, Tokyo, Japan

[73] Assignee: NEC Corporation, Japan

[21] Appl. No.: 575,993

[22] Filed: Dec. 21, 1995

[30] Foreign Application Priority Data

Dec. 22, 1994 [JP] Japan .................. 6-319681

[51] Int. Cl.$^6$ .................. H04L 9/18; H04L 9/28; H04L 9/00
[52] U.S. Cl. .................. 380/42; 380/9; 380/28; 380/29; 380/37; 380/43; 380/49
[58] Field of Search .................. 380/9, 28, 29, 380/37, 42, 43, 49, 50

[56] References Cited

U.S. PATENT DOCUMENTS

| | | | |
|---|---|---|---|
| 4,157,454 | 6/1979 | Becker | 380/37 |
| 4,172,213 | 10/1979 | Barnes et al. | 380/29 |
| 4,275,265 | 6/1981 | Davida et al. | 380/29 |
| 4,751,733 | 6/1988 | Delayaye et al. | 380/42 |
| 5,231,662 | 7/1993 | Van Rumpt et al. | 380/9 |
| 5,301,235 | 4/1994 | Shimada | 380/42 |
| 5,317,638 | 5/1994 | Kao et al. | 380/29 |
| 5,442,705 | 8/1995 | Miyano | 380/29 |

OTHER PUBLICATIONS

D.E.R. Denning, "Cryptography and Data Security", Addison–Wesley Publishing Company, 1982, pp. v–xiii and 1–133.

*Primary Examiner*—Bernarr E. Gregory
*Attorney, Agent, or Firm*—Ostrolenk, Faber, Gerb & Soffen, LLP

[57] ABSTRACT

In a product cipher apparatus, a permutation is performed upon plaintext or ciphertext to generate a first message. At least two successive substitutions are performed upon the first message to generate a second message, and the same permutation is performed upon the second message to generate a third message. The successive substitutions and the permutation are repeatedly performed upon the third message to obtain ciphertext or plaintext.

20 Claims, 17 Drawing Sheets

SMALL SIZE PRODUCT CIPHER APPARATUS

BACKGROUND OF THE INVENTION

1. Field of the Invention

The present invention relates to a product cipher apparatus for transforming plaintext into ciphertext or vice versa in a digital data communication system.

2. Description of the Related Art

In a digital data communication system, cryptographic techniques are used to prevent unauthorized disclosure and modification of data. In an encipher apparatus, plaintext is transformed into ciphertext by an encipherment algorithm using a cryptographic key. On the other hand, in a decipher apparatus, received ciphertext is transformed into the plaintext by a decipherment algorithm using the same key or a similar cryptographic key. In this case, the decipherment algorithm is a reverse process of the encipherment algorithm.

A prior art cipher apparatus, called a product cipher apparatus, alternately performs permutations and substitutions upon plaintext or ciphertext. In this case, the permutations are carried out by a transformation circuit, and the substitutions are carried out by selection functions (S-boxes) which are usually constructed by read-only memories (ROM's) (see Dorothy Elizabeth Robling Denning: "Cryptography and Data Security", Addison-Wesley Publishing Company, pp.90–101, 1982). This will be explained later in detail.

In the above-described product cipher apparatus, however, in order to attain high secrecy and authenticity, the number of S-boxes has to be increased, thus increasing the apparatus in size, which also increases the manufacturing cost.

SUMMARY OF THE INVENTION

It is an object of the present invention to provide a product cipher apparatus which can be reduced in size and cost.

According to the present invention, in a product cipher apparatus, a permutation is performed upon plaintext or ciphertext to generate a first message. At least two successive substitutions are performed upon the first message to generate a second message, and the same permutation is performed upon the second message to generate a third massage. The successive substitutions and the permutation are repetitively performed upon the third message to obtain ciphertext or plaintext.

For example, a message obtained by two successive substitutions is considerably more complex than a message obtained by a single substitution. Also, the operation time of two successive substitutions is longer than that of a pair comprised of one permutation and one substitution. However, if the number of substitutions prepared for a one-substitution operation is N, N×N substitutions can be realized by a two-successive substitution operation. In other words, the number of S-boxes can be reduced.

BRIEF DESCRIPTION OF THE DRAWINGS

The present invention will be more clearly understood from the description as set forth below, as compared with the prior art, with reference to the accompanying drawings, wherein.

DESCRIPTION OF THE PREFERRED EMBODIMENTS

Before the description of the preferred embodiments, prior art product cipher apparatuses will be explained with reference to FIGS. 1, 2, 3 and 4.

Figure 1:
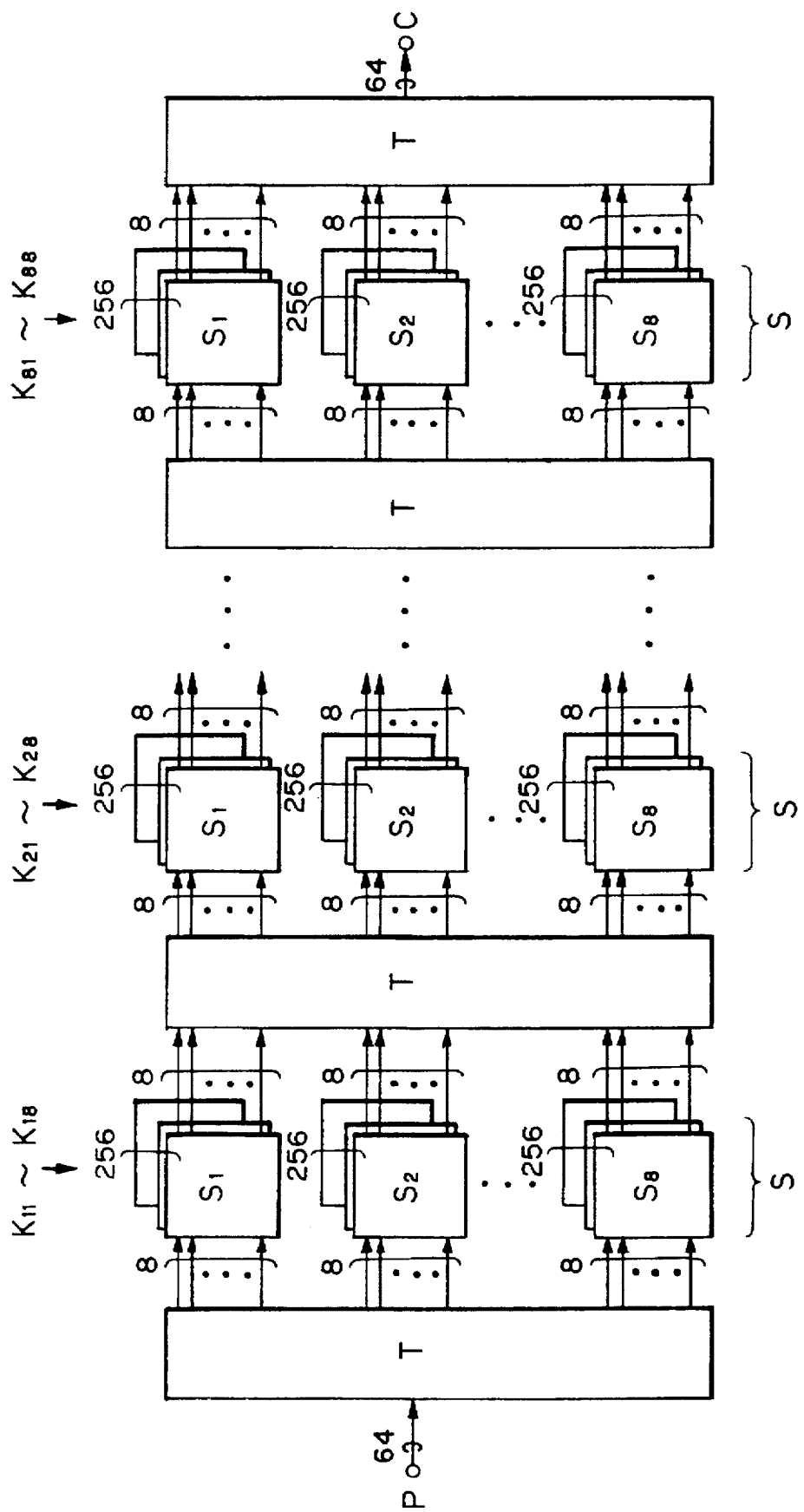
FIG. 1 is a block circuit diagram illustrating a principle of a prior art product encipherment algorithm.

In FIG. 1, which illustrates a principle of a prior art product encipherment, a 64-bit plaintext message P is supplied to a transposition circuit T which performs a permutation upon the plaintext message P. Then, a substitution circuit S performs a substitution upon a message outputted from the transposition circuit T. In this case, the substitution circuit S is divided into eight 8-bit sub-substitution circuits (S-boxes) $S_1, S_2, \ldots,$ and $S_8$ to reduce the complexity of the circuit configuration. Also, each of the S-boxes $S_1, S_2, \ldots, S_8$ is comprised of 256 ROM's, and one of the ROM's in each S-box is selected by a cryptographic key K.

Note that the S-boxes $S_1, S_2, \ldots, S_8$ can be combined into one ROM which is also simply called an S-box.

In FIG. 1, 9 permutations and 8 substitutions are alternately carried out, to obtain a 64-bit ciphertext message C. In this case, all the permutations are the same, but the substitutions are different in accordance with the cryptographic key K which includes key elements $K_{11}$, $K_{12}$, ..., $K_{18}$; $K_{21}$, $K_{22}$, ..., $K_{28}$; ...; $K_{81}$, $K_{82}$, ..., $K_{88}$ each having 8 bits ($2^8$=256). For example, the first substitution is carried out in accordance with the key elements $K_{11}$, $K_{12}$, ..., $K_{18}$. As the result, one ROM of the S-box $S_1$ is selected by the key element $K_{11}$, one ROM of the S-box $S_2$ is selected by the key element $K_{12}$, and one ROM of the S-box $S_8$ is selected by the key element $K_{18}$.

Figure 2:
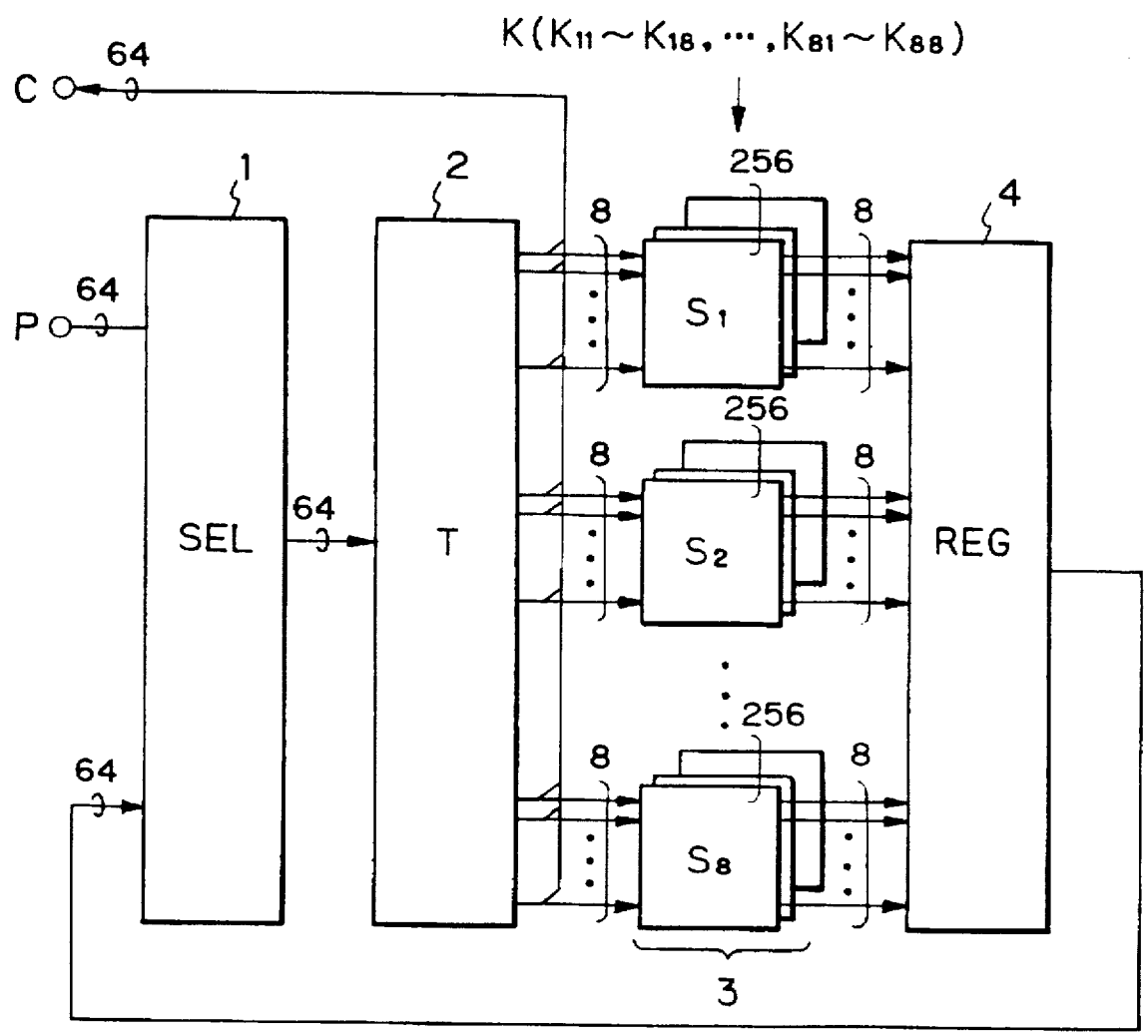
FIG. 2 is a block circuit diagram illustrating a prior art product encipher apparatus for realizing the principle as illustrated in FIG. 1.
Figure 4:
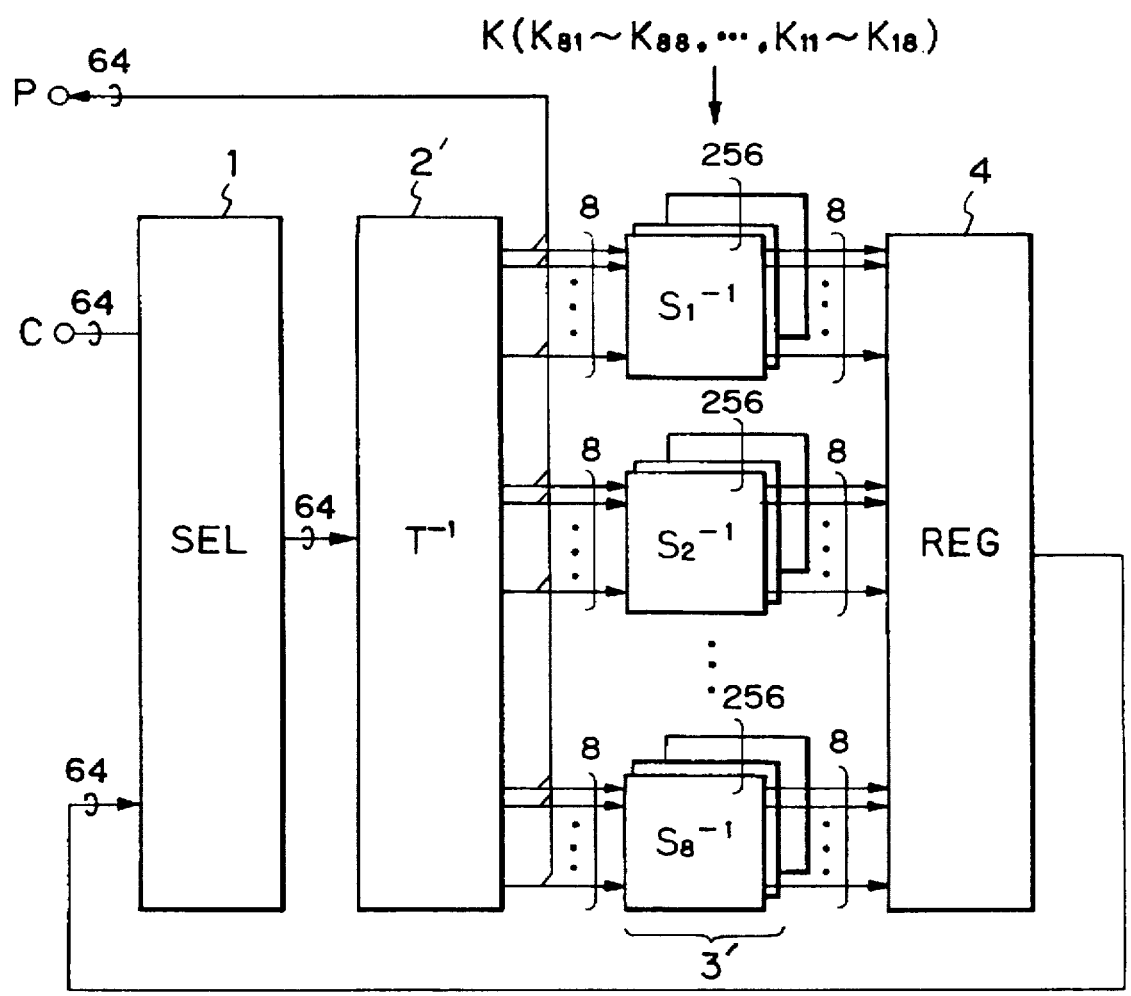
FIG. 4 is a block circuit diagram illustrating a prior art product decipher apparatus for realizing the principle as illustrated in FIG. 3.

In FIG. 2, which illustrates a prior art product encipher apparatus for realizing the principle of FIG. 1, reference numeral 1 designates a selector, 2 designates a transposition circuit for carrying out the permutation as illustrated in FIG. 1, 3 designates a substitution circuit as illustrated in FIG. 1, and 4 designates a register.

First, the selector 1 selects its upper input, so that a plaintext message P is supplied to the transposition circuit 2. Thus, a permutation is performed upon the plaintext message P, and then a substitution is performed thereupon by the substitution circuit 3 in accordance with key elements $K_{11}$ to $K_{18}$ of a cryptographic key K. Then, the result is stored in the register 4.

Next, the selector 1 selects its lower input, so that the output of the register 4 is supplied to the transposition circuit 2. Thus, a permutation is performed upon the output of the register 4, and then a substitution is performed thereupon by the substitution circuit 3 in accordance with key elements $K_{21}$ to $K_{28}$ of a cryptographic key K. Then, the result is again stored in the register 4.

The above-described operations where the selector 1 selects its lower input are repeated eight times, so as to obtain a ciphertext message C at an output terminal connected to the transposition circuit 2.

Figure 3:
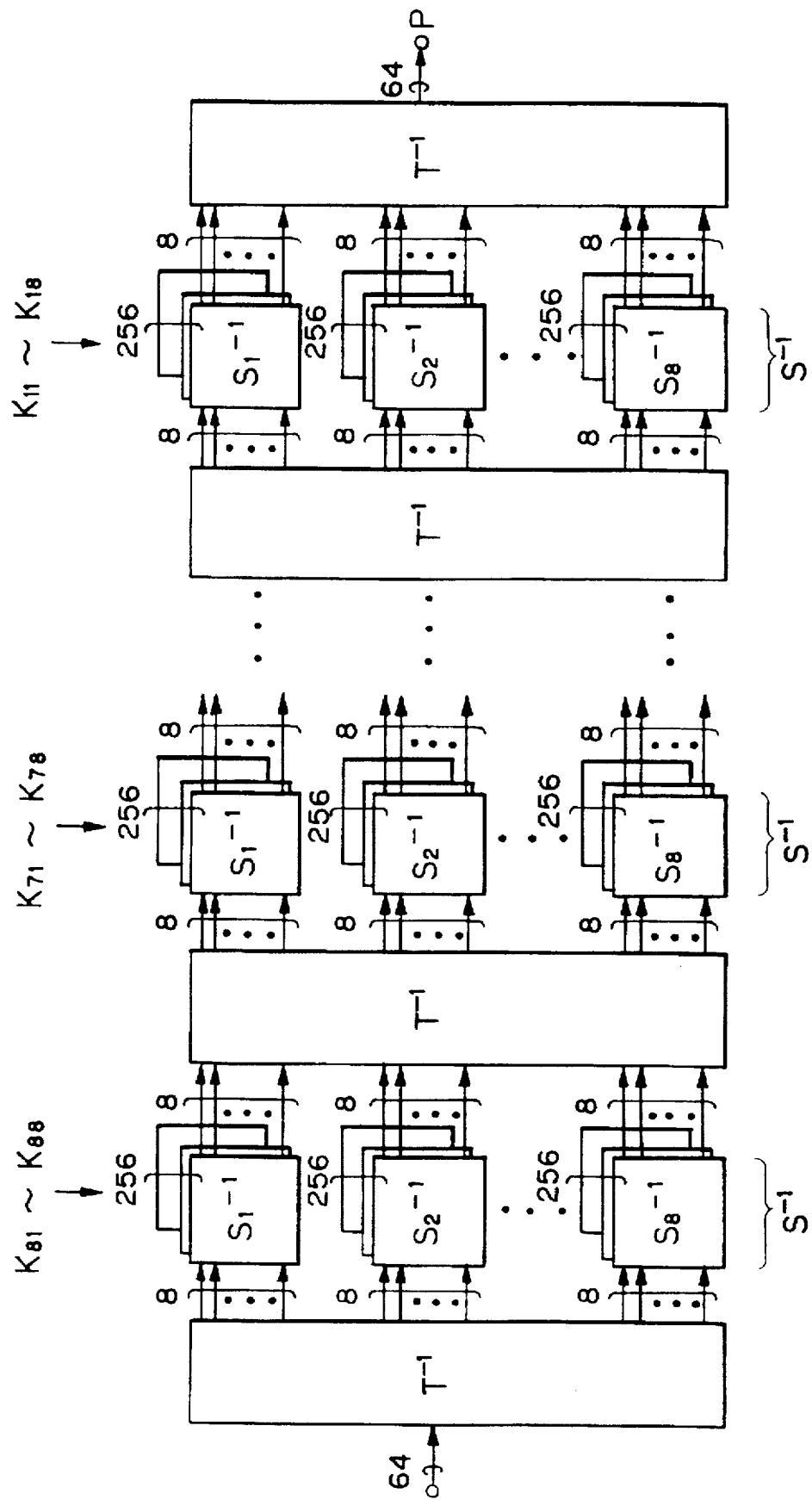
FIG. 3 is a block circuit diagram illustrating a principle of a prior art product decipherment algorithm.

The product encipher apparatus of FIGS. 1 and 2 can be applied to a product decipher apparatus as illustrated in FIGS. 3 and 4. In FIG. 4, a transposition circuit 2' carries out an inverse permutation of the permutation of the transposition circuit 2 of FIG. 2, and a substitution circuit 3' carries out an inverse substitution of the substitution circuit 3 of FIG. 2.

In the product cipher apparatuses of FIGS. 1, 2, 3 and 4, however, in order to attain high secrecy and authenticity, the number of S-boxes has to be increased. For example, all of the S-boxes are comprised of 256×8-bit substitutions, i.e., a 65536-byte ROM (256×256 bytes). Thus, the cipher apparatus is increased in size and in cost.

Figure 5:
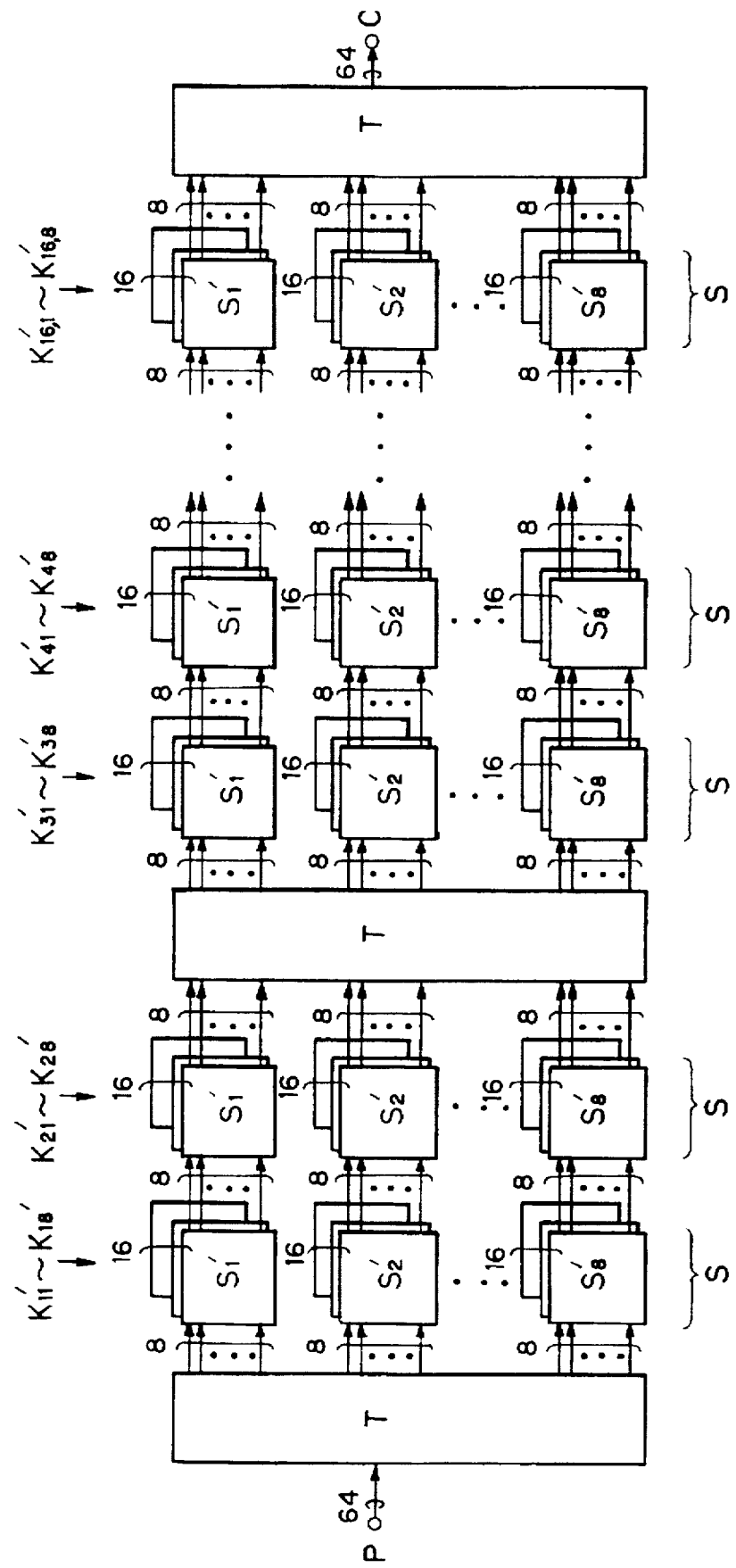
FIG. 5 is a block circuit diagram illustrating a first principle of a product encipherment algorithm according to the present invention.

In FIG. 5, which illustrates a first principle of a product encipherment algorithm according to the present invention, a 64-bit plaintext message P is supplied to a transposition circuit T which performs a permutation upon the plaintext message P. Then, two substitution circuits S performs two successive substitutions upon a message outputted from the transposition circuit T. In this case, each of the substitution circuits S is divided into eight 8-bit sub-substitution circuits (S-boxes) $S_1$', $S_2$', ..., and $S_8$' to reduce the complexity of the circuit configuration. Also, each of the S-boxes $S_1$', $S_2$', ..., $S_8$' is comprised of 16 ROM's, and one of the ROM's in each S-box is selected by a cryptographic key K.

In this case, note that the S-boxes $S_1$', $S_2$', ..., $S_8$' can be combined into one ROM which is also simply called an S-box.

In FIG. 5, 9 permutations and 16 substitutions are alternately carried out, to obtain a 64-bit ciphertext message C. In this case, all the permutations are the same, but the substitutions are different in accordance with the cryptographic key K which includes key elements $K_{11}$', $K_{12}$', ..., $K_{18}$', $K_{21}$', $K_{22}$', ..., $K_{28}$', ..., $K_{16,1}$', $K_{16,2}$', ..., $K_{16,8}$' each having 4 bits (24=16). For example, the first substitution is carried out in accordance with the key elements $K_{11}$', $K_{12}$', ..., $K_{18}$'. As the result, one ROM of the S-box $S_1$' is selected by the key element $K_{11}$', one ROM of the S-box $S_2$' is selected by the key element $K_{12}$', and one ROM of the S-box $S_8$' is selected by the key element $K_{18}$'.

Figure 6:
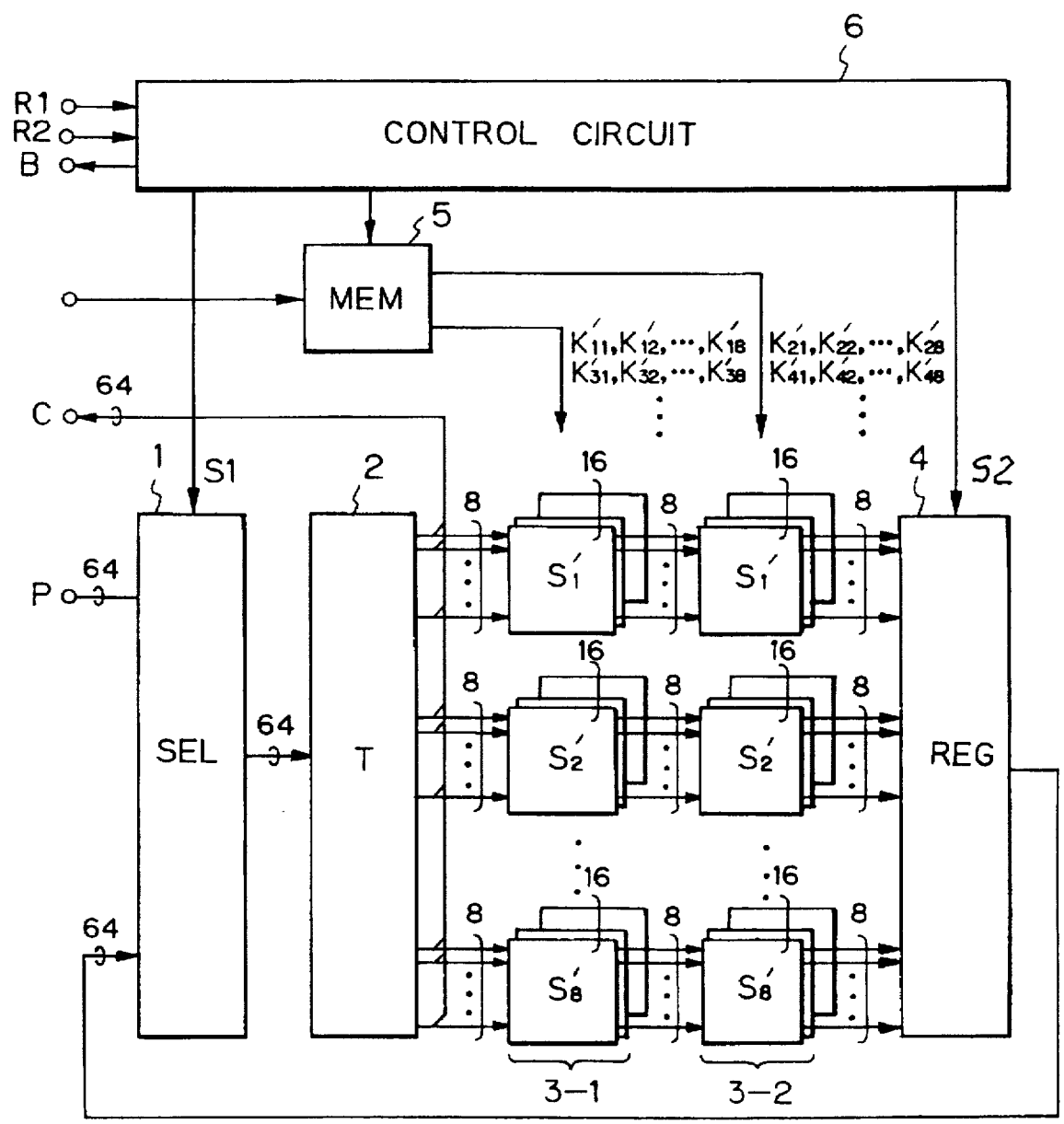
FIG. 6 is a block circuit diagram illustrating a first embodiment of the product encipher apparatus according to the present invention.

In FIG. 6, which illustrates a first embodiment of the product encipher apparatus according to the present invention, the principle of FIG. 5 is realized. In FIG. 6, two substitution circuits 3-1 and 3-2 are provided instead of the substitution circuit 3 of FIG. 2.

Also, reference numeral 5 designates a memory for storing a cryptographic key K comprised of key elements $K_{11}$', $K_{12}$', ..., $K_{18}$'; $K_{21}$', $K_{22}$', ..., $K_{28}$'; $K_{16,1}$', $K_{16,2}$', ..., $K_{16,8}$', each having 4 bits. In this case, the key elements $K_{i1}$', $K_{i2}$', ..., $K_{i8}$', (i=1, 3, 5, ...) are used for carrying out the i-th substitution by the S-boxes $S_1$', $S_2$', ..., $S_8$' of the substitution circuit 3-1, and the key elements $K_{i+1,1}$', $K_{i+1,2}$', ..., $K_{i+1,8}$' (i=1, 3, 5, ...) are used for carrying out the (i+1)-th substitution by the S-boxes $S_1$', $S_2$', ..., $S_8$' of the substitution circuit 3-2.

Further, reference numeral 6 designates a control circuit which may be comprised of a microcomputer or the like. The control circuit 6 receives a cryptographic key write request signal R1 and an encipherment request signal R2 to generate a busy signal B and control the selector 1, the substitution circuits 3-1 and 3-2, the register 4, and the memory 5.

The operation of the control circuit 6 of FIG. 6 is explained next with reference to FIG. 7.

First, at step 701, the control circuit 6 awaits a cryptographic key write request signal R1. Upon receipt of the signal R1, the control proceeds to step 702 which performs a write operation upon the memory 5 for a cryptographic key K which is, in this case, 512 (=8×4×16) bits. As a result, the cryptographic key K is written into the memory 5.

Next, at step 703, the control circuit 6 awaits an encipherment request signal R2. Upon receipt of the signal R2, the control proceeds to step 704 which turns ON a busy signal B (="1").

Also, at step 705, a value i is initialized to 1. Further, at step 706, the control circuit 6 causes a signal S1 to be "0", so that the selector 1 selects its upper input. As a result, a plaintext message P is supplied via the selector 1 to the transposition circuit 2. Thus, a permutation is performed upon the plaintext message P.

Next, at step 707, the control circuit 6 reads the key elements $K_{i1}$', $K_{i2}$', ..., $K_{i8}$' from the memory 5 and transmits them to the S-boxes $S_1$', $S_2$', ..., $S_8$', respectively, of the substitution circuit 3-1, and simultaneously, the control circuit 6 reads the key elements $K_{i+1,1}$', $K_{i+1,2}$', ..., $K_{i+1,8}$', from the memory 5 and transmits them to the S-boxes $S_1$', $S_2$', ..., $S_8$' respectively, of the substitution circuit 3-2. As a result, the substitution circuit 3-1 performs a substitution upon the output of the transposition circuit 2 in accordance with the key elements $K_{i1}$', $K_{i2}$', ..., $K_{i8}$', and the substitution circuit 3-2 performs a substitution upon the output of the substitution circuit 3-1 in accordance with the key elements $K_{i+1,1}$', $K_{i+1,2}$', ..., $K_{i+1,8}$'. In other words, two substitutions are successively carried out.

Then, when a predetemined time period has passed so that the operation of the substitution circuits 3-1 and 3-2 is determined, the control proceeds via step 708 to step 709 which generates a signal S2 to operate the register 4. As a result, the result of the two successive substitutions is stored in the register 4.

Next, at step 710, the control circuit 6 causes the signal S1 to be "1", so that the selector 1 selects its lower input. As a result, the output of the register 4 is supplied via the selector 1 to the transposition circuit 2. Thus, a permutation is performed upon the output of the register 4.

Next, at step 711, the value i is counted up by +2, and at step 712, it is determined whether or not i>15. As the result, if i≦15, the control at steps 707 through 712 is repeated. If i>15, the control proceeds to step 713 which turns OFF the busy signal B.

Figure 7:
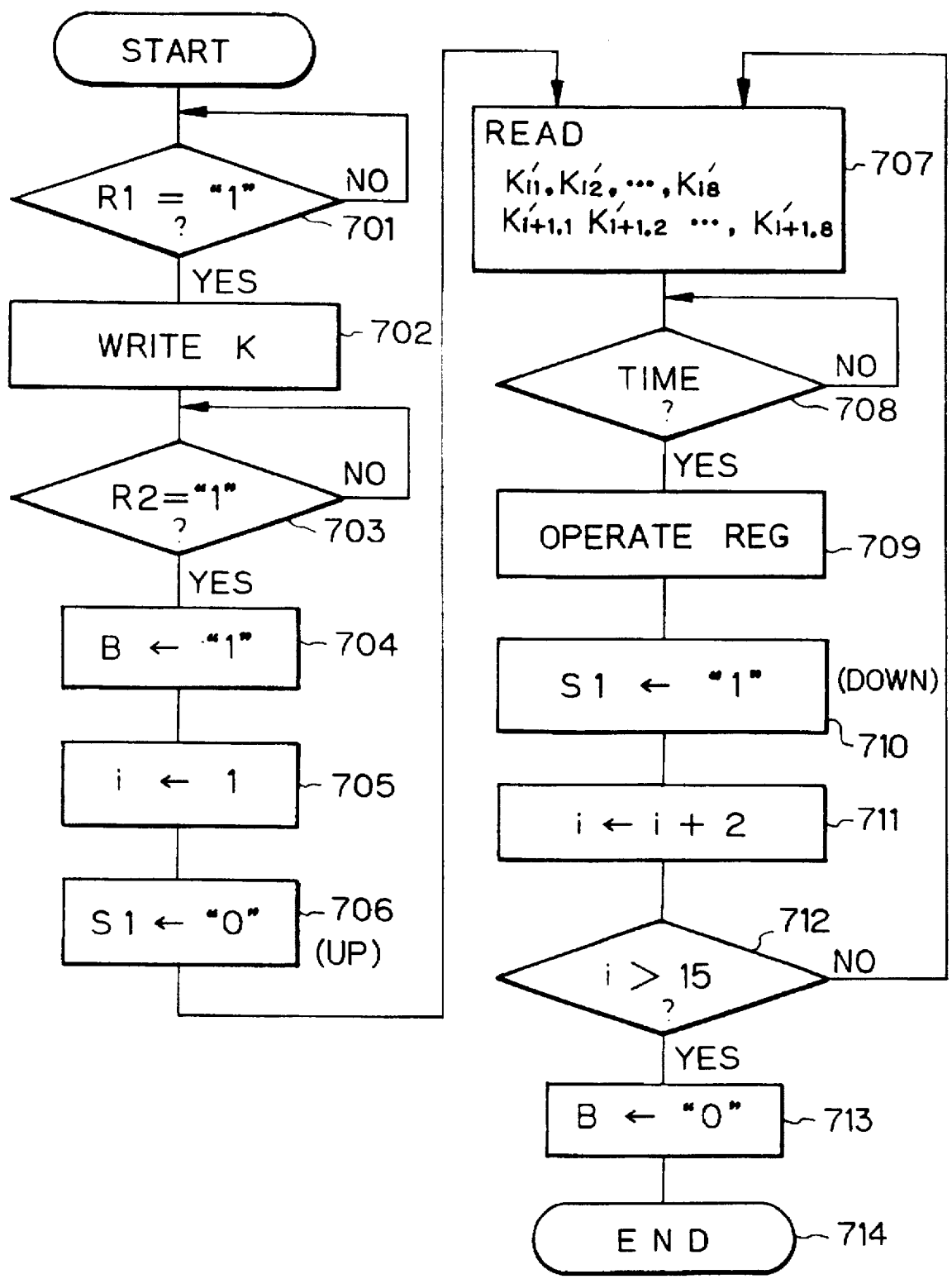
FIG. 7 is a flowchart showing the operation of the control circuit of FIG. 6.

Then, the routine of FIG. 7 is completed by step 714.

Figure 8:
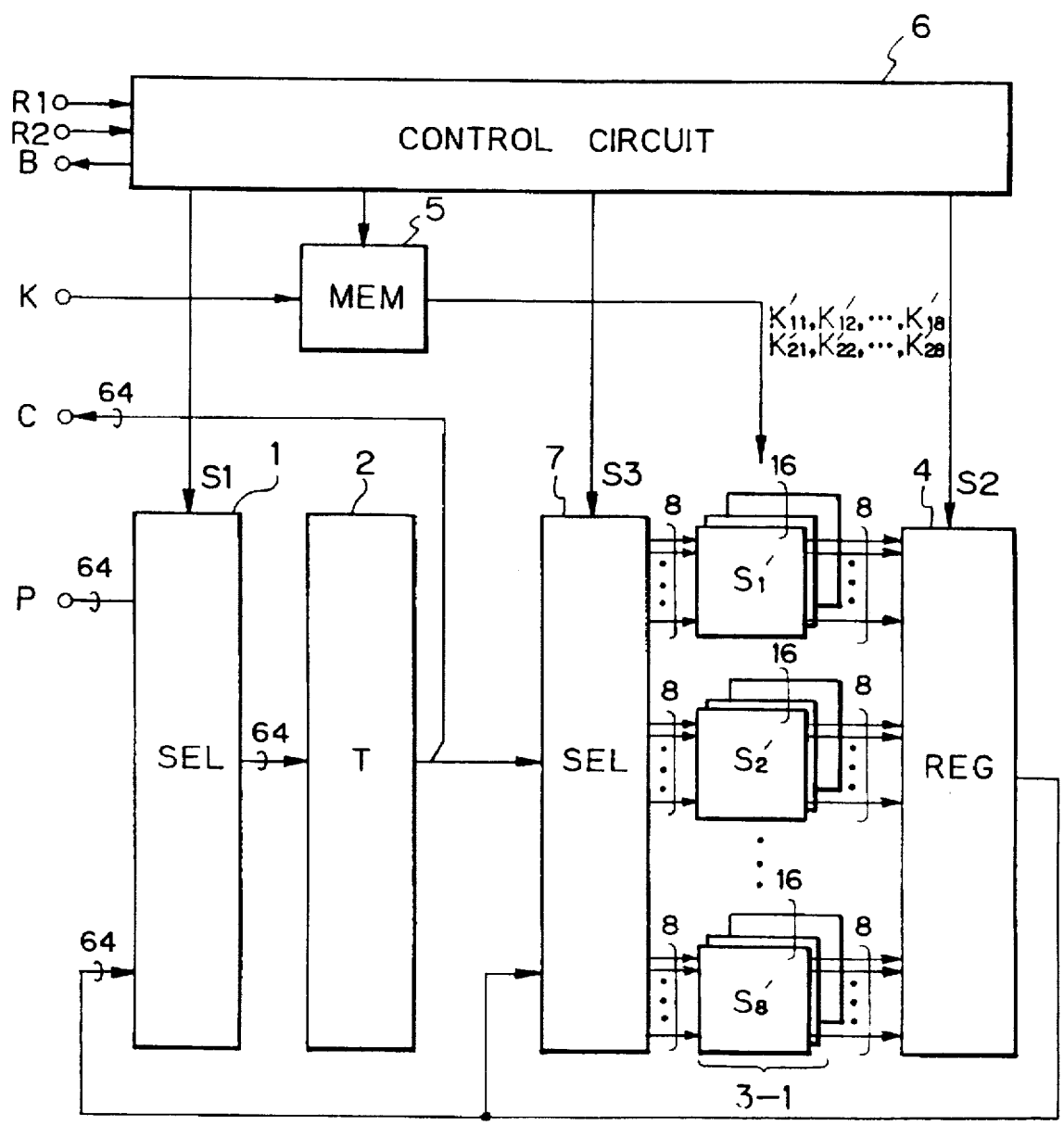
FIG. 8 is a block circuit diagram illustrating a second embodiment of the product encipher apparatus according to the present invention.

In FIG. 8, which illustrates a second embodiment of the product encipher apparatus according to the present invention, the principle of FIG. 5 is also realized. In FIG. 8, the substitution circuit 3-2 of FIG. 6 is deleted, and instead of this, a selector 7 is provided between the transposition circuit 2/the register 4 and the substitution circuit 3-1. That is, the output of the transposition circuit 2 and the output of the register 4 are selectively supplied by the selector 7 to the substitution circuit 3-1.

The operation of the control circuit 6 of FIG. 8 is explained next with reference to FIG. 9.

First, at step 901, the control circuit 6 awaits a cryptographic key write request signal R1. Upon receipt of the signal R1, the control proceeds to step 902 which performs a write operation upon the memory 5 for a cryptographic key K which is, in this case, 512 (=8×4×16) bits. As a result, the cryptographic key K is written into the memory 5.

Next, at step 903, the control circuit 6 awaits an encipherment request signal R2. Upon receipt of the signal R2, the control proceeds to step 904 which turns ON a busy signal B (="1"). Also, at step 905, a value i is initialized to 1. Further, at step 906, the control circuit 6 causes a signal S1 to be "0", so that the selector 1 selects its upper input. As a result, a plaintext message P is supplied via the selector 1 to the transposition circuit 2. Thus, a permutation is performed upon the plaintext message P. Further, at step 907, the control circuit 6 causes a signal S3 to be "0", so that the selector 7 selects its upper input. As a result, the output of the transposition circuit 2 is supplied via the selector 7 to the substitution circuit 3-1.

Next, at step 908, the control circuit 6 reads the key elements $K_{i1}'$, $K_{i2}'$, . . . , $K_{i8}'$ from the memory 5 and transmits them to the S-boxes $S_1'$, $S_2'$, . . . , $S_8'$, respectively, of the substitution circuit 3-1. As the result, the substitution circuit 3-1 performs a substitution upon the output of the transposition circuit 2 in accordance with the key elements $K_{i1}'$, $K_{i2}'$, . . . , $K_{i8}'$.

Then, when a predetemined time period has passed so that the operation of the substitution circuit 3-1 is determined, the control proceeds via step 909 to step 910 which generates a signal S2 to operate the register 4. As a result, the result of the substitution is stored in the register 4.

Next, at step 911, the control circuit 6 causes the signal S3 to be "1", so that the selector 7 selects its lower input. As a result, the output of the register 4 is supplied via the selector 7 to the substitution circuit 3-1.

Next, at step 912, the control circuit 6 reads the key elements $K_{i+1,1}'$, $K_{i+1,2}'$, . . . , $K_{i+1,8}'$ from the memory 5 and transmits them to the S-boxes $S_1'$, $S_2'$, . . . , $S_8'$, respectively, of the substitution circuit 3-1. As a result, the substitution circuit 3-1 performs a substitution upon the output of the rogister 4 in accordance with the key elements $K_{i+1,1}'$, $K_{i+1,2}'$, . . . , $K_{i+1,8}'$.

Then, when a predetemined time period has passed so that the operation of the substitution circuit 3-1 is determined, the control proceeds via step 913 to step 914 which generates a signal S2 to operate the register 4. As a result, the result of the substitution is stored in the register 4.

Thus, two substitutions are successively carried out.

Next, at step 915, the value i is counted up by +2, and at step 916, it is determined whether or not i>15. As the result, if i≦15, the control proceeds to steps 917 and 918. If i>15, the control proceeds to step 919 which turns OFF the busy signal B.

On the other hand, at step 917, the control circuit 6 causes the signal S1 to be "1", so that the selector 1 selects its lower input. As a result, the output of the register 4 is supplied via the selector 1 to the transposition circuit 2. Thus, a permutation is performed upon the output of the register 4. Also, at step 918, the control circuit 6 causes the signal S3 to be "0", so that the selector 7 selects its upper input. As a result, the output of the transposition circuit 2 is supplied via the selector 7 to the subsititution circuit 3-1. Then, the control at steps 908 through 916 is repeated.

Figure 9:
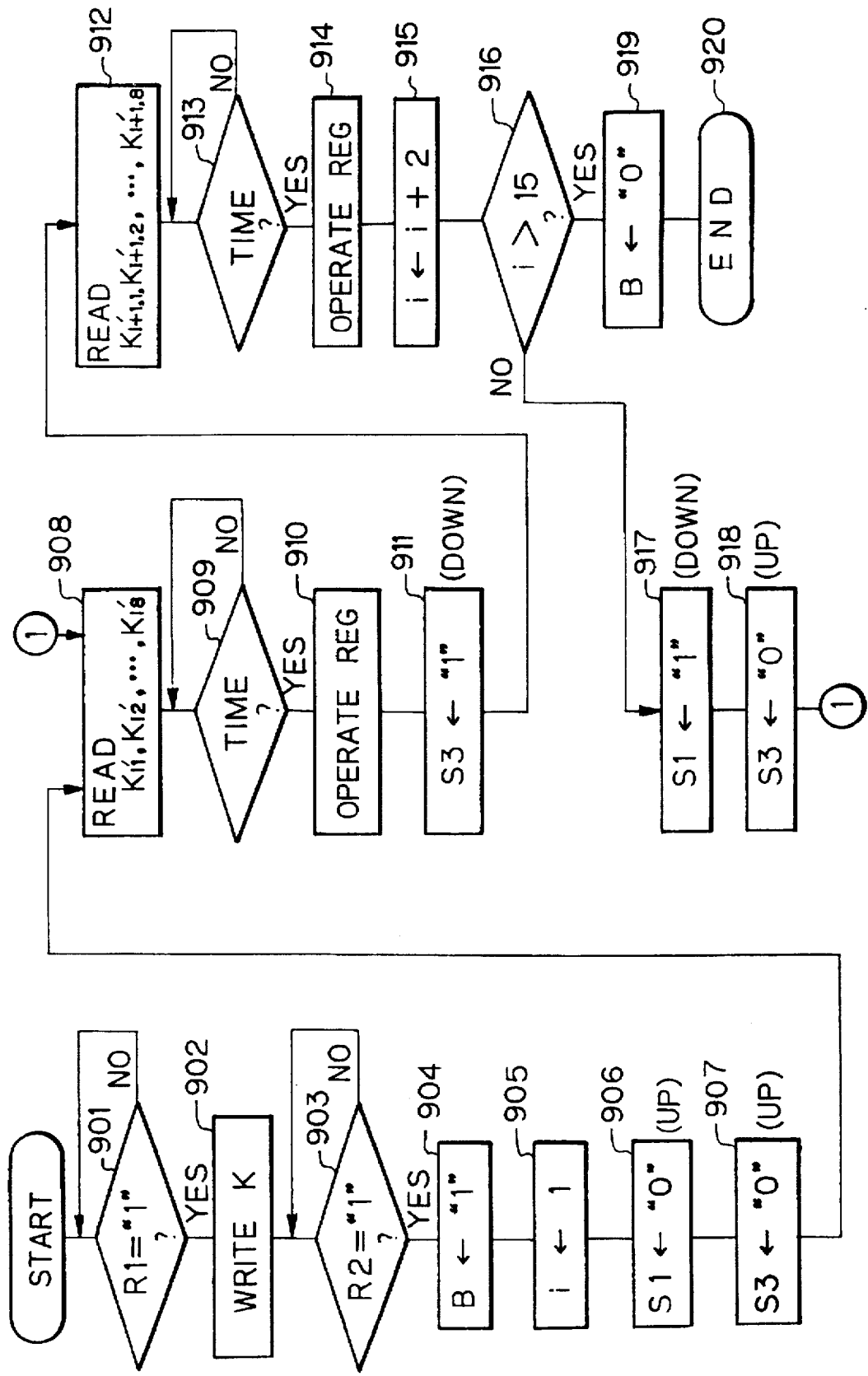
FIG. 9 is a flowchart showing the operation of the control circuit of FIG. 8.

The routine of FIG. 9 is completed by step 920.

For example, a message obtained by two successive substitutions is considerably more complex than a message obtained by a single substitution.

Also, the operation time of two successive substitutions is longer than that of a pair comprised of one permutation and one substitution. However, in FIGS. 1 and 2, the number of substitutions prepared for a one-substitution operation is 256. Contrary to this, in FIGS. 5, 6 and 7, the number of substitutions prepared for a one-substitution operation is only 16, in order to realize 256 (=16×16) substitutions for a two-successive substitution operation. Therefore, in FIG. 8, all of the S-boxes can be realized a single 4096-byte ROM (16×256 bytes).

Figure 10:
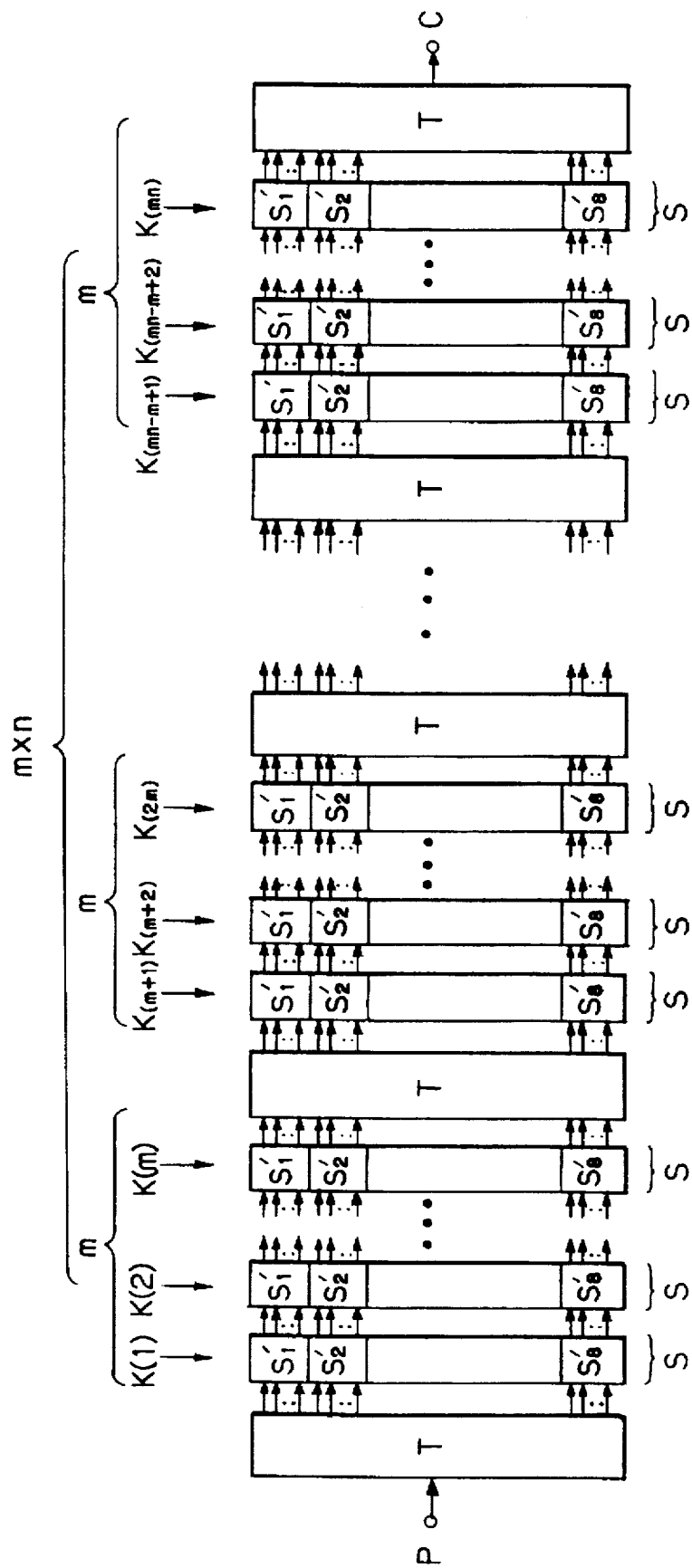
FIG. 10 is a block circuit diagram illustrating a second principle of a product encipherment algorithm according to the present invention.

In FIG. 10, which illustrates a second principle of a product encipherment algorithm according to the present invention, a plaintext message P is supplied to a transposition circuit T which performs a permutation upon the plaintext message P. Then, m substitution circuits S perform m successive substitutions upon a message outputted from the transposition circuit T. In this case, each of the substitution circuits S is divided into eight sub-substitution circuits (S-boxes) $S_1'$, $S_2'$, . . . , and $S_8'$ to reduce the complexity of the circuit configuration. Also, each of the S-boxes $S_1'$, $S_2'$, . . . , $S_8'$ is comprised of a plurality of ROM's. One of the ROM's in each S-box is selected by key elements K(1), K(2), . . . , and K(m).

In this case, note that the S-boxes $S_1'$, $S_2'$, . . . , $S_8'$ can be combined into one ROM which is also simply called an S-box.

In FIG. 10, (n+1) permutations and m×n substitutions are alternately carried out to obtain a cipher text message. In this case, all the permutations are the same, but the substitutions are different in accordance with the cryptographic key K which includes key elements K(1), K(2), . . . , K(m); K(m+1), K(m+2), . . . , K(2m); . . . , K(mn−m+1), K(mn−m+2), . . . , K(mn). For example, the first substitution is carried out in accordance with the key element K(1) which is further divided into $K_{11}'$, $K_{12}'$, . . . , $K_{18}'$. As a result, one ROM of the S-box $S_1'$ is selected by the key element $K_{11}'$, one ROM of the S-box $S_2'$ is selected by the key element $K_{12}'$, and one ROM of the S-box $S_8'$ is selected by the key element $K_{18}'$.

The principle of FIG. 10 is also realized by the encipher apparatus of FIG. 8 whose operation is explained next with reference to FIG. 11.

First, at step 1101, an initialization is carried out. That is, upon receipt of a cryptographic key write request signal R1, the control circuit 6 performs a write operation upon the memory 5 for a cryptographic key K comprised of K(1), K(2), . . . As the result, the cryptographic key K is written into the memory 5. Also, upon receipt of an encipherment request signal R2, the control circuit 6 turns ON a busy signal B (="1").

Next, at step 1102, the control circuit 6 causes a signal S1 to be "0", so that the selector 1 selects its upper input. As the result, a plaintext message P is supplied via the selector 1 to the transposition circuit 2. Thus, an initial permutation is performed upon the plaintext message P.

Next, at step 1103, a value j is initialized at 1.

Next, at step 1104, a value i is initialized at 1.

Next, at step 1105, the control circuit 6 causes a signal S3 to be "0", so that the selector 7 selects its upper input. As the result, the output of the transposition circuit 2 is supplied via the selector 7 to the substitution circuit 3-1. Then, the control circuit 6 reads the key element K(jm−m+1) from the memory 5 and transmits it to the S-boxes $S_1'$, $S_2'$, . . . , $S_8'$ of the substitution circuit 3-1. As a result, the substitution circuit 3-1 performs a substitution upon the output of the transposition circuit 2 in accordance with the key element K(jm−m+1). Then, when a predetermined time period has passed so that the operation of the substitution circuit 3-1 is determined, the control circuit 6 generates a signal S2 to operate the register 4. As a result, the result of the substitution is stored in the register 4.

Next, at step 1106, the value i is counted up by 1.

Next, at step 1107, the control circuit 6 causes the signal S3 to be "1", so that the selector 7 selects its lower input. As a result, the output of the register 4 is supplied via the selector 7 to the substitution circuit 3-1.

Next, at step 1107, the control circuit 6 reads the key element K(jm−m+i) from the memory 5 and transmits it to the S-boxes $S_1'$, $S_2'$, . . . , $S_8'$ of the substitution circuit 3-1. As a result, the substitution circuit 3-1 performs a substitution upon the output of the register 4 in accordance with the key element K(jm−m+i). Then, when a predetermined time period has passed so that the operation of the substitution circuit 3-1 is determined, the control circuit 6 generates a signal S2 to operate the register 4. As a result, the result of the substitution is stored in the register 4.

Next, at step 1108, it is determined whether or not i≧m is satisfied. As a result, if i≦m−1, the control returns to step 1106, thus repeating the control at steps 1106 through 1108. Otherwise, the control proceeds to step 1109.

Thus, m substitutions are successively carried out.

Next, at step 1109, the control circuit 6 causes the signal S1 to be "1", so that the selector 1 selects its lower input. As a result, a permutation is performed upon the output of the register 4.

Next, at step 1110, the value i is counted up by +1, and at step 1111, it is determined whether or not j>n. As a result, if j≦n, the control at steps 1104 through 1111 is repeated. If j>n, the control proceeds to step 1112 which turns OFF the busy signal B.

Figure 11:
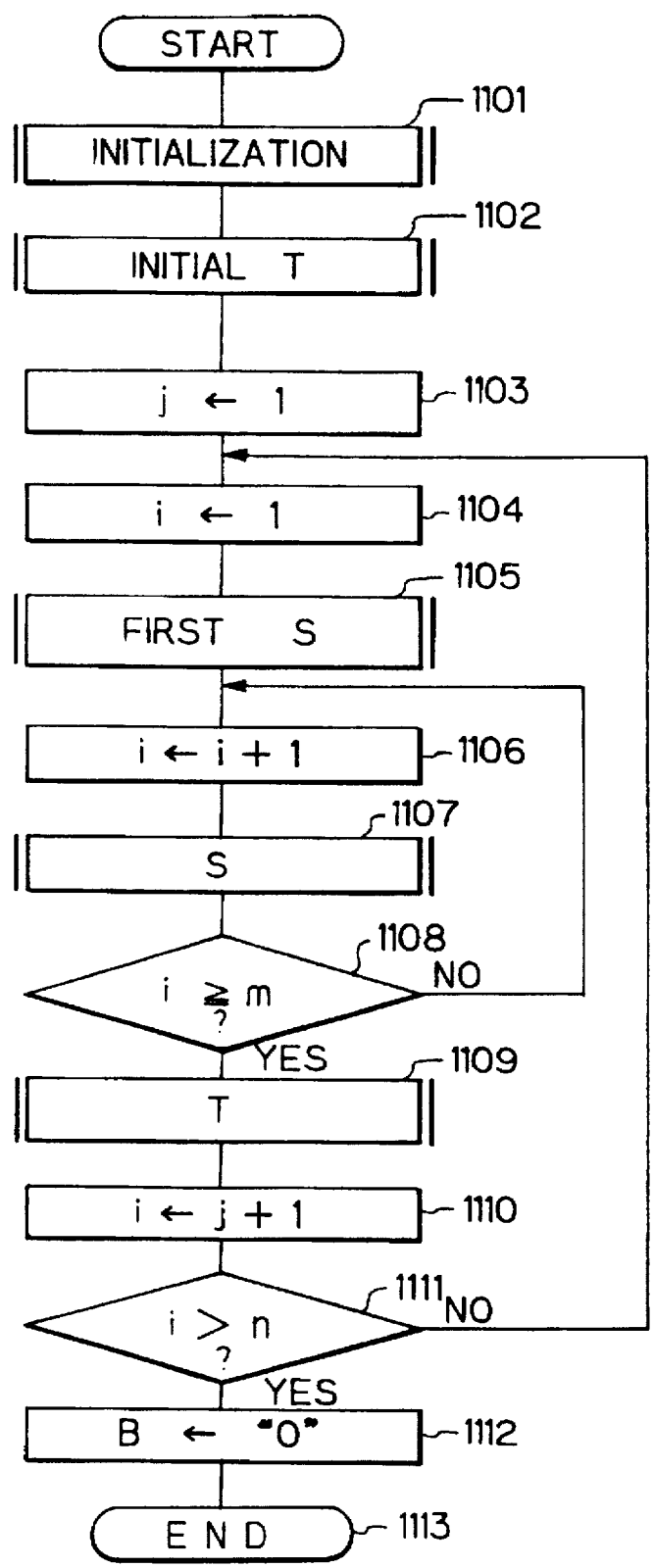
FIG. 11 is a flowchart showing the operation of the control circuit of FIG. 8 for realizing the product encipherment algorithm of FIG. 10.

The routine of FIG. 11 is completed by step 1113.

Thus, the principle of FIG. 10 is realized.

Figure 12:
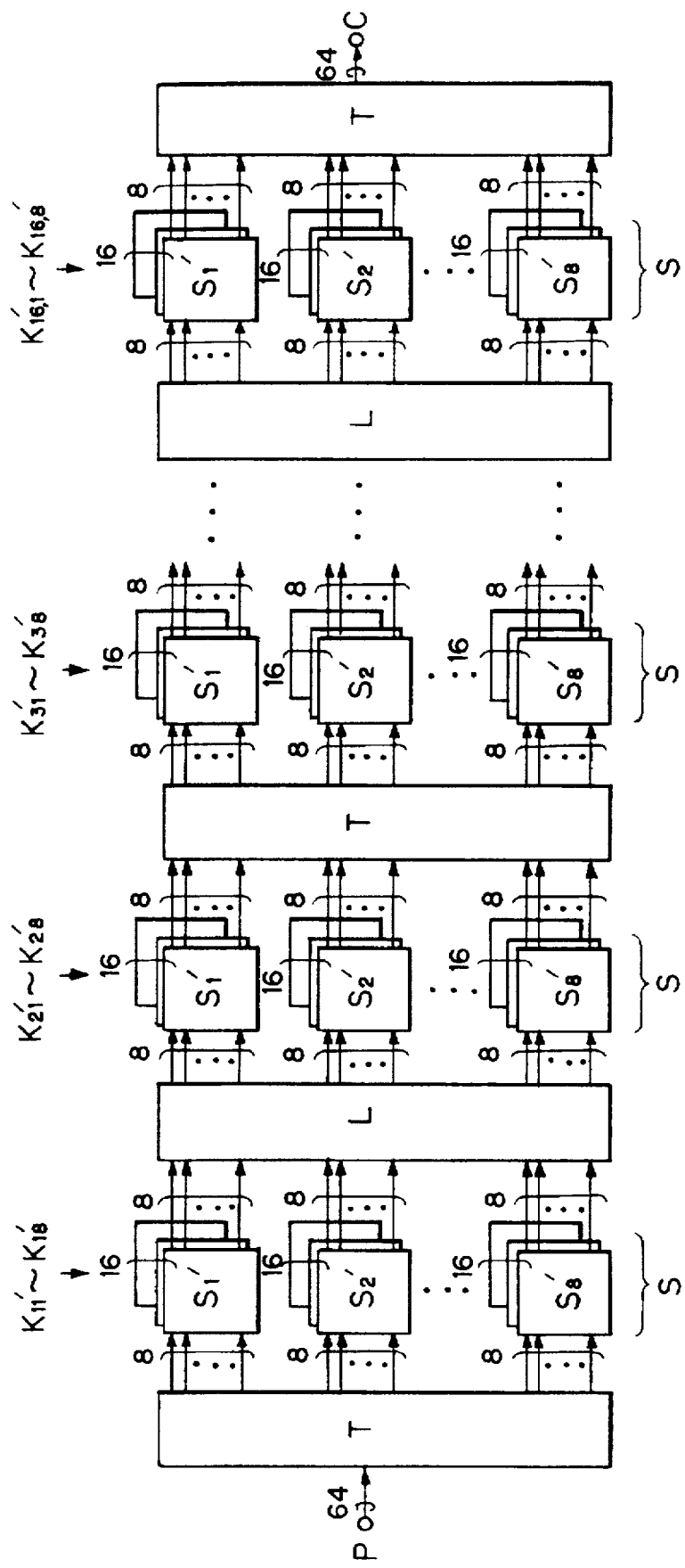
FIG. 12 is a block circuit diagram illustrating a third principle of a product encipherment algorithm according to the present invention.

In FIG. 12, which illustrates a third principle of a product encipherment algorithm according to the present invention, a linear transformation circuit L is interposed between the two successive substitution circuits S of FIG. 5. The linear transformation circuit L carries out a linear transformation by $$Y = AX$$

where X is a 64-dimensional vector (mod 2) defined by input data of the linear transformation circuit L; and A is $$A = \begin{pmatrix} A_1 & O & \cdots & O \\ O & A_2 & \cdots & O \\ \cdot & \cdot & & \cdot \\ \cdot & \cdot & & \cdot \\ \cdot & \cdot & & \cdot \\ O & O & \cdots & A_8 \end{pmatrix}$$

Also, $A_i$ (i=1, 2, . . . , 8) is an 8×8 matrix (mod 2) and O is an 8×8 matrix having all 0 elements; and Y is a 64-dimensional vector (mod 2) defined by output data of the linear transformation circuit L.

The linear transformation is deteriorated in cryptography as compared with the permutation and substitution. However, the linear transformation has excellent data spread characteristics, to thereby obtain higher secrecy and authenticity.

Figure 13:
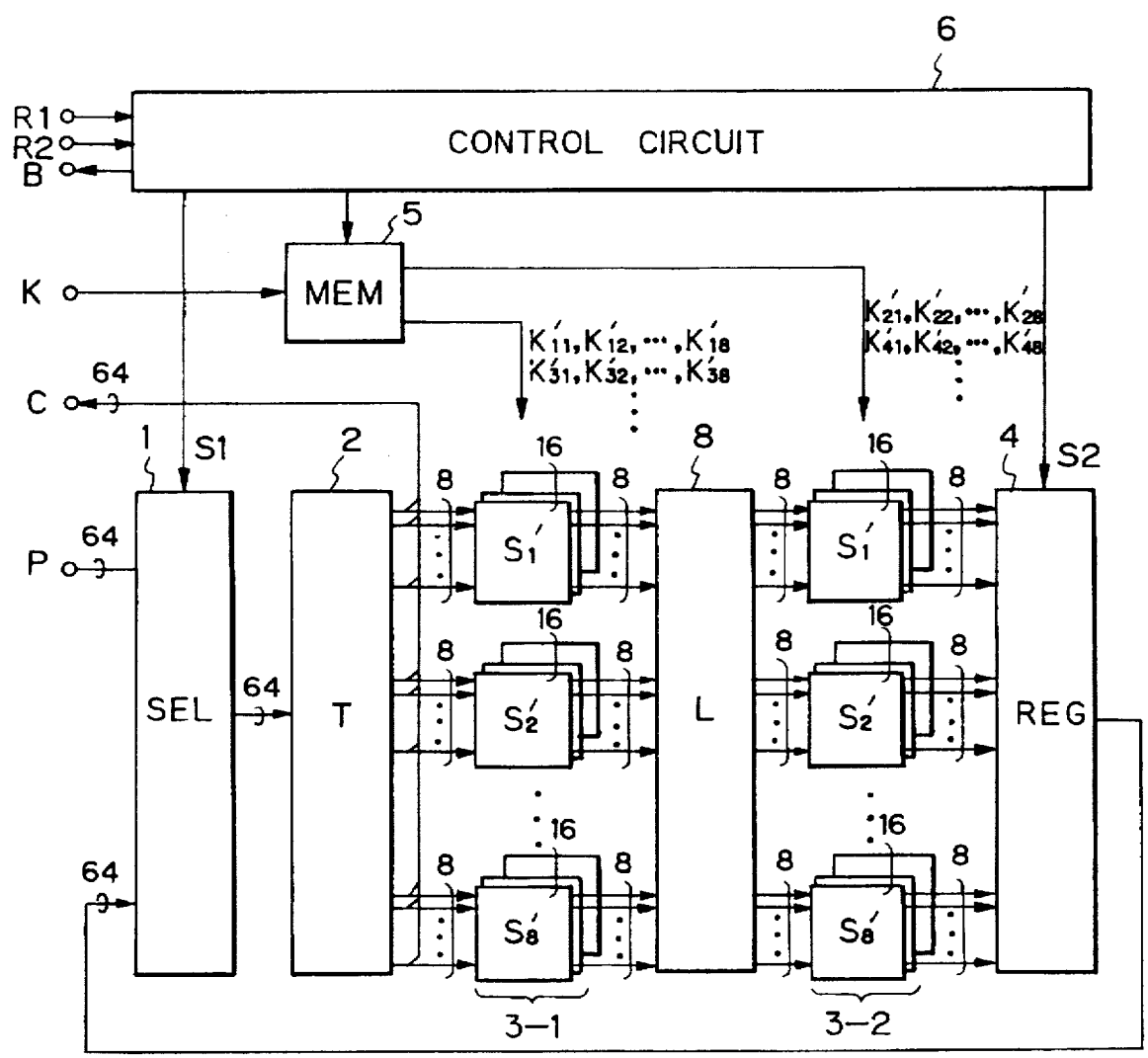
FIG. 13 is a block circuit diagram illustrating a third embodiment of the product encipher apparatus according to the present invention.

In FIG. 13, which illustrates a third embodiment of the product encipher apparatus according to the present invention, the principle of FIG. 12 is realized. In FIG. 13, a linear transformation circuit 8 is interposed between the substitution circuits 3-1 and 3-2 of FIG. 6. In this case, the control circuit 6 operates in the same way as the control circuit 6 of FIG. 6 using the flowchart of FIG. 7. As a result, a linear transformation is carried out between two successive substitutions.

Figure 14:
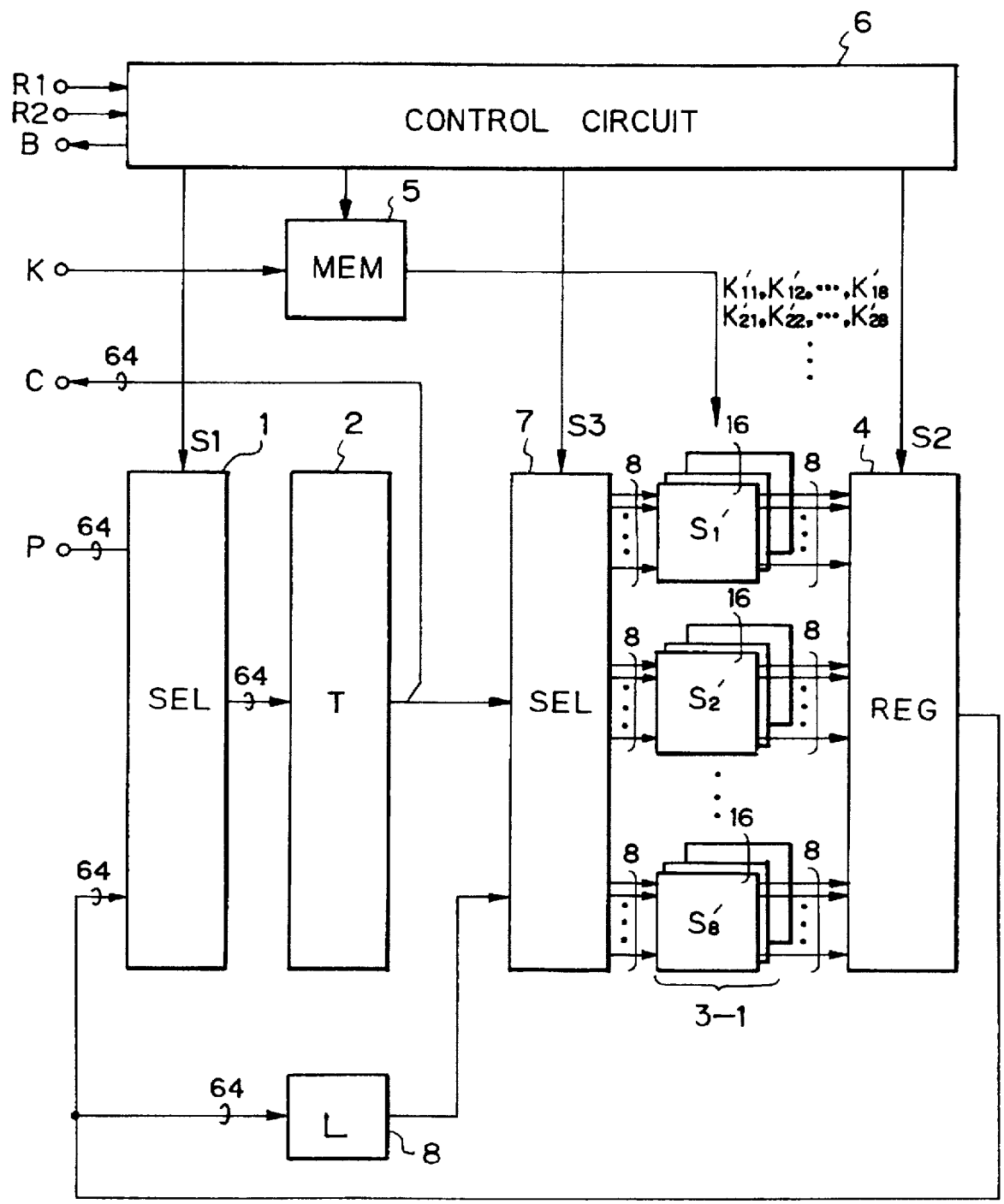
FIG. 14 is a block circuit diagram illustrating a fourth embodiment of the product encipher apparatus according to the present invention.

In FIG. 14, which illustrates a fourth embodiment of the product encipher apparatus according to the present invention, the principle of FIG. 12 is also realized. In FIG. 14, a linear transformation circuit 8 is interposed between the register 4 and the substitution circuit 3-1 of FIG. 8. In this case, the control circuit 6 operates in the same way as the control circuit 6 of FIG. 8 using the flowchart of FIG. 9. As a result, a linear transformation is carried out between two successive substitutions.

Figure 15:
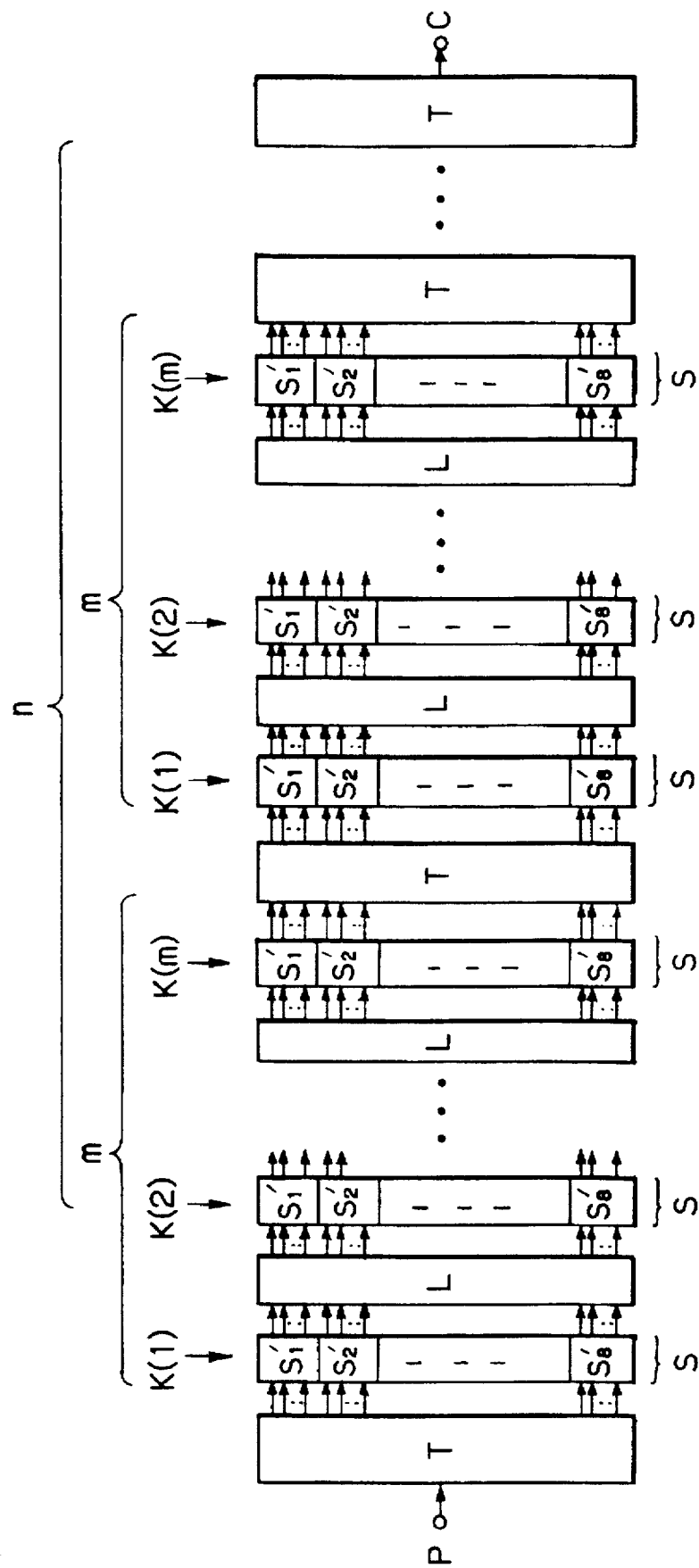
FIG. 15 is a block circuit diagram illustrating a fourth principle of a product encipherment algorithm according to the present invention.

In FIG. 15, which illustrates a fourth principle of a product encipherment algorithm according to the present invention, a linear transformation circuit L is interposed between the two successive substitution circuits S of FIG. 10. The linear transformation circuit L has excellent data spread characteristics, to thereby obtain higher secrecy and authenticity.

The principle of FIG. 15 is also realized by the apparatus of FIG. 14. In this case, the control circuit 6 operates using the flowchart of FIG. 11. As a result, a linear transformation is carried out between m successive substitutions.

Figure 16:
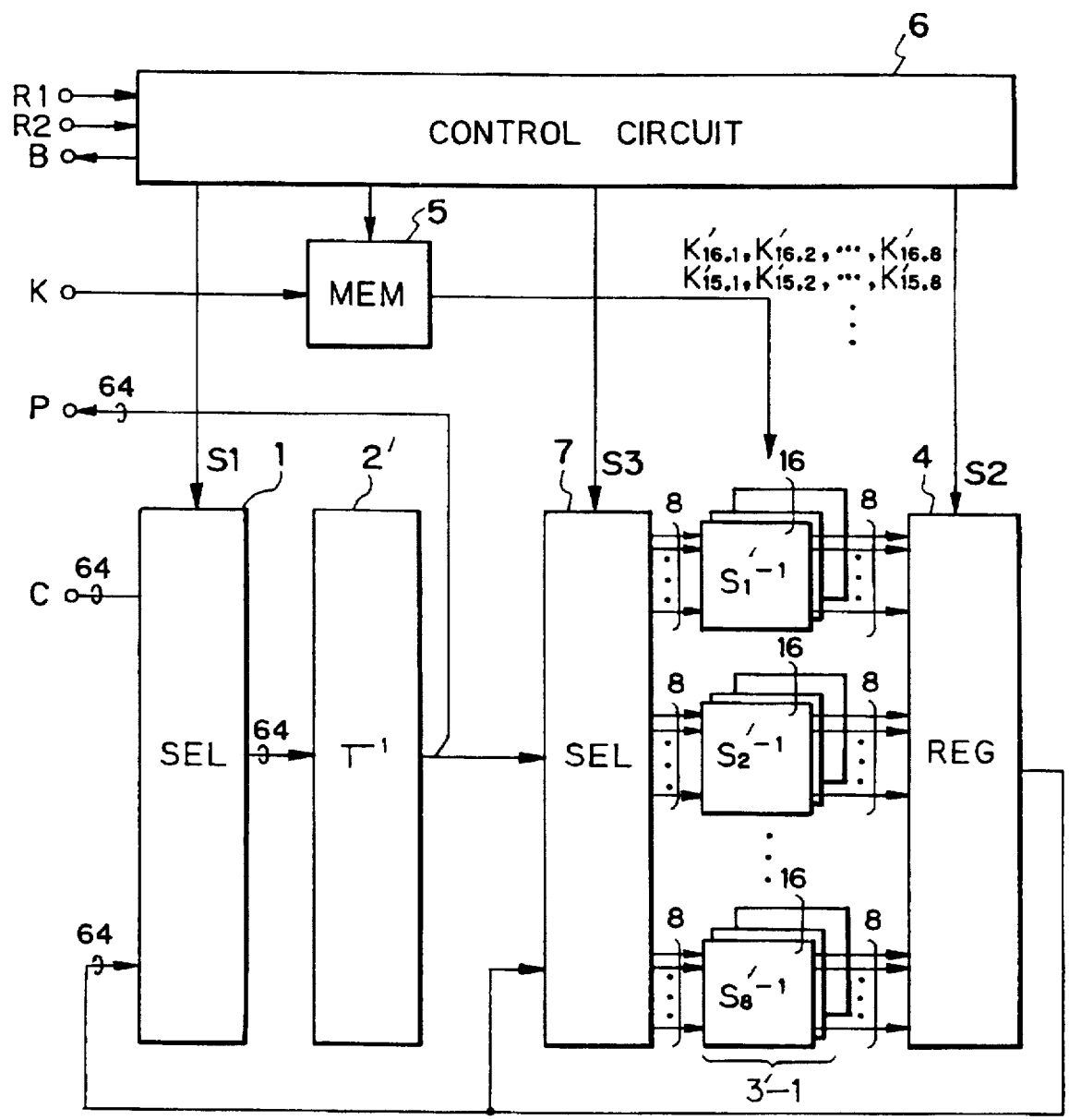
FIGS. 16 and 17 are block circuit diagrams illustrating modifications of the apparatuses of FIGS. 8 and 14, respectively.
Figure 17:
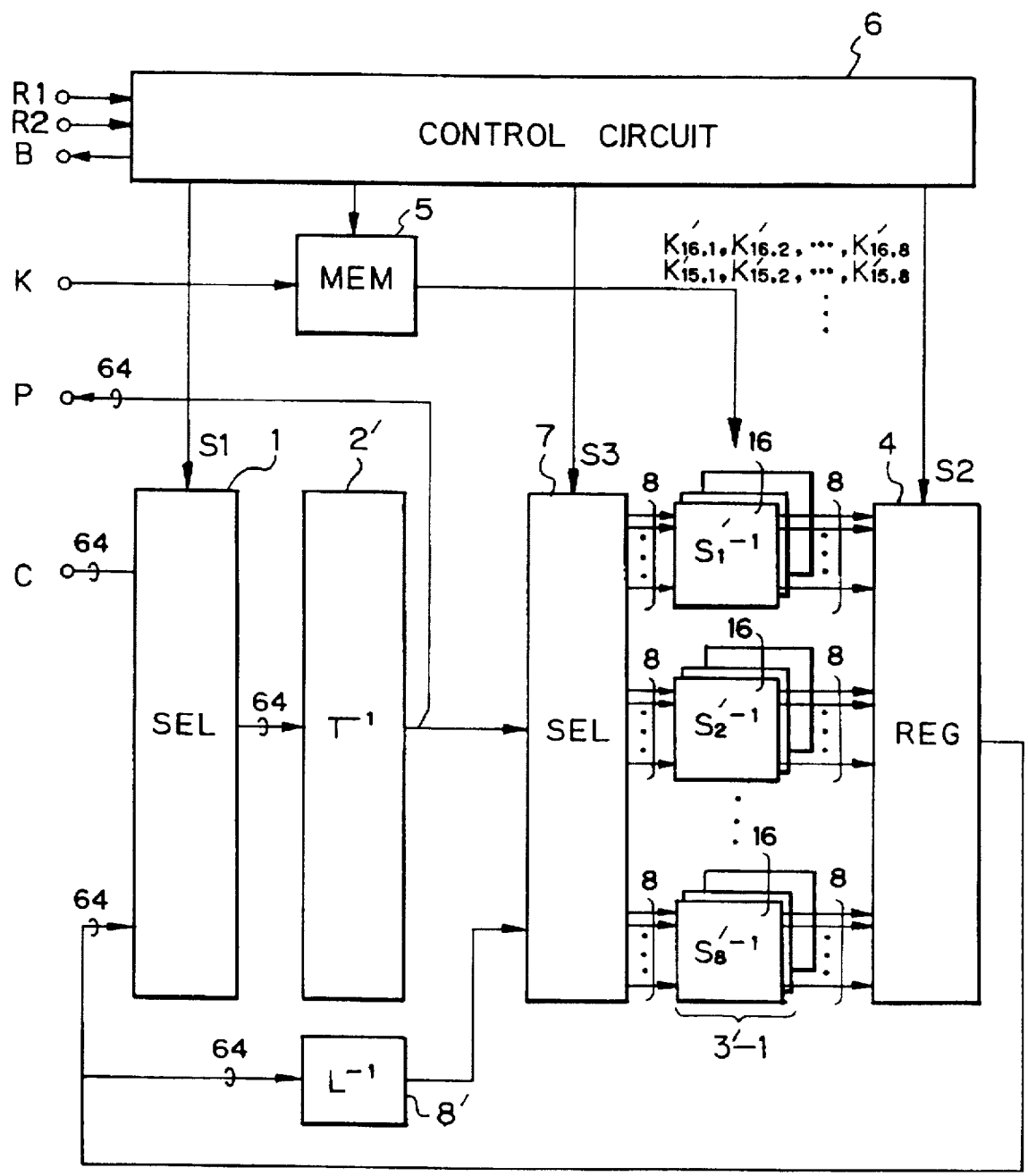

The above-described embodiments relate to product encipher apparatus; however, the present invention can be applied to a product decipher apparatus. For example, the apparatus of FIGS. 8 and 14 are modified to product decipher apparatuses as illustrated in FIGS. 16 and 17. In FIGS. 16 and 17, a ciphertext message C is supplied to the slector 1 and a plaintext message P is obtained at the output terminal. Also, a transposition circuit 2' carries out an inverse permutation of the permutation carried out by the transposition circuit 2. Further, a substitution circuit 3'-1 carries out an inverse substitution of the substitution carried out by the substitution circuit 3-1. Further, the sequence of key elements $K_{16,1}'$, $K_{16,2}'$, . . . , $K_{16,8}'$; $K_{15,1}'$, $K_{15,2}'$, . . . , $K_{15,8}'$; . . . ; $K_{11}'$, $K_{12}'$, . . . , $K_{18}'$ read from the memory 5 is opposite to that in FIGS. 8 and 14. Further, a linear transformation circuit 8' carries out an inverse linear transformation of the linear transformation carried out by the linear transformation circuit 8.

As explained hereinbefore, according to the present invention, since all of the S-boxes are reduced in size, the apparatus can be reduced in size and in cost.

I claim:

1. An encipher apparatus for transforming plaintext into ciphertext, comprising:

a first permutation means for performing a permutation upon said plaintext to generate a first message;

a substitution means for performing at least two successive substitutions upon a message in accordance with an encipher key, to generate a second message;

a second permutation means for performing said permutation upon said second message to generate a third message; and means for initially operating said substitution means and said second permutation means for said first message and repeatedly operating said substitution means and said second permutation means for said third message to obtain said ciphertext.

2. An apparatus as set forth in claim 1, further comprising a linear transformation means for carrying out a linear transformation between said substitutions of said substitution means.

3. An encipher apparatus for transforming plaintext into ciphertext, comprising:

a transposition means;

a plurality of substitution means in series connected to said transposition means;

a register connected to said substitution means;

a selector having a first input for receiving said plaintext, a second input connected to said register, and an output connected to said transposition means;

an output terminal connected to said transposition means; and control means for initially operating said selector to select the first input thereof so that said transposition means, said substitution means and said register are once operated, and the, operating said selector to select the second input thereof so that said transposition means, said substitution means and said register are repeatedly operated, thus obtaining said ciphertext at said output terminal.

4. An apparatus as set forth in claim 3, further comprising a plurality of linear transformation means each connected between said substitution means.

5. An apparatus as set forth in claim 3, further comprising a memory means for generating a cryptographic key and transmitting said cryptographic key to said substitution means.

6. An encipher apparatus for transforming plaintext into ciphertext, comprising:

a transposition means;

a substitution means;

a register connected to said substitution means;

a first selector having a first input for receiving said plaintext, a second input connected to said register, and an output connected to said transposition means;

a second selector having a first input connected to said transposition means, a second input connected to said register, and an output connected to said substitution means;

an output terminal connected to said transposition means;

a first control means for initially operating said first and second selectors to select the first input of said first selector and the first input of said second selector so that said transposition means, said substitution means and said register are once operated;

a second control means for operating said second selector to select the second input thereof to once operate said substitution means and said register;

a third control means for operating said first and second selectors to select the second input of said first selector and the second input of said second selector so that said transposition means, said substitution means and said register are once operated; and a fourth control means for repeatedly operating said second and third control means to obtain said ciphertext at said output terminal.

7. An apparatus as set forth in claim 6, further comprising a linear transformation means connected between said register and said second selector.

8. An apparatus as set forth in claim 6, further comprising a memory means for generating a cryptographic key, and transmitting said cryptographic key to said substitution means.

9. A decipher apparatus for transforming ciphertext into plaintext, comprising:

a first permutation means for performing a permutation upon said ciphertext to generate a first message;

a substitution means for performing at least two successive substitutions upon a message in accordance with a decipher key, to generate a second message;

a second permutation means for performing said permutation upon said second message to generate a third message; and means for initially operating said substitution means and said second permutation means for said first message and repeatedly operating said substitution means and said second permutation means for said third message to obtain said plaintext.

10. An apparatus as set forth in claim 9, further comprising a linear transformation means for carrying out a linear transformation between said substitutions of said substitution means.

11. A decipher apparatus for transforming ciphertext into plaintext, comprising:

a transposition means;

a plurality of substitution means in series connected to said transposition means;

a register connected to said substitution means;

a selector having a first input for receiving said ciphertext, a second input connected to said register, and an output connected to said transposition means;

an output terminal connected to said transposition means; and control means for initially operating said selector to select the first input thereof so that said transposition means, said substitution means and said register are once operated, and then, operating said selector to select the second input thereof so that said transposition means, said substitution means and said register repeatedly operate, thus obtaining said plaintext at said output terminal.

12. An apparatus as set forth in claim 11, further comprising a plurality of linear transformation means each connected between said substitution means.

13. An apparatus as set forth in claim 11, further comprising a memory means for generating a cryptographic key and transmitting said cryptographic key to said substitution means.

14. A decipher apparatus for transforming ciphertext into plaintext, comprising:

a transposition means;

a substitution means;

a register connected to said substitution means;

a first selector having a first input for receiving said ciphertext, a second input connected to said register, and an output connected to said transposition means;

a second selector having a first input connected to said transportation means, a second input connected to said register, and an output connected to said substitution means;

an output terminal connected to said transposition means;

a first control means for initially operating said first and second selectors to select the first input of said first selector and the first input of said second selector so that said transposition means, said substitution means and said register are once operated;

a second control means for operating said second selector to select the second input thereof to once operate said substitution means and said register;

a third control means for operating said first and second selectors to select the second input of said first selector and the second input of said second selector so that said transposition means, said substitution means and said register are once operated; and a fourth control means for repetitively operating said second and third control means to obtain said plaintext at said output terminal.

15. An apparatus as set forth in claim 14, further comprising a linear transformation means connected between said register and said second selector.

16. An apparatus as set forth in claim 14, further comprising a memory means for generating a cryptographic key and transmitting said cryptographic key to said substitution means.

17. An encipher apparatus for transforming plaintext into ciphertext, comprising:

a transposition circuit;

a plurality of substitution circuits in series connected to said transposition circuit;

a register connected to said substitution circuits;

a selector having a first input for receiving said plaintext, a second input connected to said register, and an output connected to said transposition circuit;

an output terminal connected to said transposition circuit; and a control circuit initially operating said selector to select the first input thereof so that said transposition circuit, said substitution circuits and said register are once operated, and then, operating said selector to select the second input thereof so that said transposition circuit, said substitution circuits and said register are repeatedly operated, thus obtaining said ciphertext at said output terminal.

18. An encipher apparatus for transforming plaintext into ciphertext, comprising:

a transposition circuit;

a substitution circuit;

a register connected to said substitution circuit;

a first selector having a first input for receiving said plaintext, a second input connected to said register, and an output connected to said transposition circuit;

a second selector having a first input connected to said transposition circuit, a second input connected to said register, and an output connected to said substitution circuits;

an output terminal connected to said transposition circuit;

a first control unit for initially operating said first and second selectors to select the first input of said first selector and the first input of said second selector so that said transposition circuit, said substitution circuit and said register are once operated;

a second control unit for operating said second selector to select the second input thereof to once operate said substitution circuit and said register;

a third control unit for operating said first and second selectors to select the second input of said first selector and the second input of said second selector so that said transposition circuit, said substitution circuit and said register are once operated; and a fourth control unit for repeatedly operating said second and third control units to obtain said ciphertext at said output terminal.

19. A decipher apparatus for transforming ciphertext into plaintext, comprising:

a transposition circuit;

a plurality of substitution circuits in series connected to said transposition circuit;

a register connected to said substitution circuits;

a selector having a first input for receiving said ciphertext, a second input connected to said register, and an output connected to said transposition circuit; and an output terminal connected to said transportation circuit; and control circuit for initially operating said selector to select the first input thereof so that said transposition circuit, said substitution circuits and said register are once repeated, and then, operating said selector to select the second input thereof so that said transposition circuit, said substitution circuits and said register repeatedly operate, thus obtaining said plaintext at said output terminal.

20. A decipher apparatus for transforming ciphertext into plaintext, comprising:

a transposition circuit;

a substitution circuit;

a register connected to said substitution circuit;

a first selector having a first input for receiving said ciphertext, a second input connected to said register, and an output connected to said transposition circuit;

a second selector having a first input connected to said transportation circuit, a second input connected to said register, and an output connected to said substitution circuit;

an output terminal connected to said transposition circuit;

a first control unit for initially operating said first and second selectors to select the first input of said first selector and the first input of said second selector so that said transposition circuit, said substitution circuit and said register are once operated;

a second control unit for operating said second selector to select the second input thereof to once operate said substitution circuit and said register;

a third control unit for operating said first and second selectors to select the second input of said first selector and the second input of said second selector so that said transposition circuit, said substitution circuit and said register are once operated; and a fourth control unit for repetitively operating said second and third control units to obtain said plaintext at said output terminal.

* * * * *